United States Patent [19]
Beard

[11] 3,734,156
[45] May 22, 1973

[54] SELF LOCKING NUTS
[75] Inventor: Albert Beard, Pembroke, Wales
[73] Assignee: Firth Cleveland Extrusions Limited, Pembroke, Pembrokeshire, Wales
[22] Filed: June 15, 1970
[21] Appl. No.: 46,436

[30] Foreign Application Priority Data
June 16, 1969 Great Britain.....................30,455/69

[52] U.S. Cl. ..................................151/21 B, 10/86 A
[51] Int. Cl..............................................F16b 39/284
[58] Field of Search ..................151/21 B, 21 R, 21 B

[56] References Cited
UNITED STATES PATENTS

| | | | |
|---|---|---|---|
| 3,208,494 | 9/1965 | Skidmore | 151/21 B |
| 2,452,192 | 10/1948 | Hosking | 151/21 B |
| 1,522,565 | 1/1925 | Whitman | 151/21 B |
| 2,679,879 | 1/1954 | Engstrom | 151/21 B |
| 3,441,073 | 4/1969 | Johnson | 151/21 B |

Primary Examiner—Edward C. Allen
Attorney—Dean S. Edmonds, Willis H. Taylor, R. Morton Adams, Leslie B. Young, James W. Laist, David Weild, Jr., Merton S. Neill, Hal E. Seagraves, Harold A. Traver, J. Philip Anderegg, Stanton T. Lawrence, Jr., Frank F. Scheck, Clyde C. Metzger, Robert McKay, S. Leslie Misrock, Keith E. Multenger, Charles J. Brown, Robert J. Kadel, David Weild, III, David J. Toomey, Charles E. McKenney and Harry C. Jones, III

[57] ABSTRACT

An all-metal self locking nut with a polygonal nut body, a crown extending from the non-bearing end of the nut body, and a screw-threaded bore extending through the nut body and crown. The crown has a frustoconical surface defined by a straight line revolved around the axis of the nut at a predetermined angle to that axis and extending from the side of the nut body to a region at or near the emergent periphery of the nut bore at the crown. This frustoconical surface is interrupted by an annular ledge or recess preferably produced by an axial punch prior to the threading of the nut bore, and having a flat base extending in a plane parallel to the bearing end of the nut body and perpendicular to the axis of the nut and an inner surface at right angles to the flat base. Subsequent to the threading of the bore, it is deformed inwardly within the crown by symmetrically arranged indentations in the region of the annular ledge or recess. Each of the indentations has in axial section a surface inclined to the nut axis at an angle smaller than the said predetermined angle of the frustoconical surface. The indentations may be produced by an axial die having a plurality of strike surfaces for formation of the indentations with intermediate relieved portions.

4 Claims, 6 Drawing Figures

PATENTED MAY 22 1973

INVENTOR
Albert Beard
BY
ATTORNEYS

INVENTOR
Albert Beard
ATTORNEYS

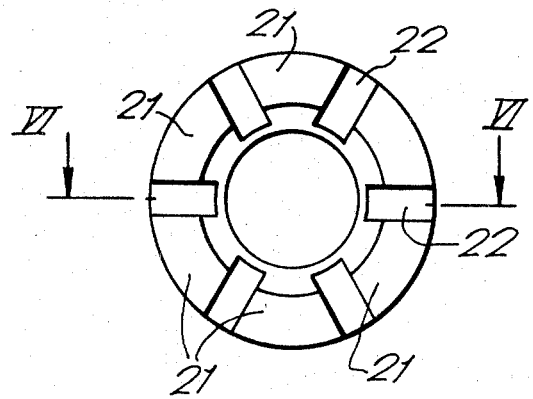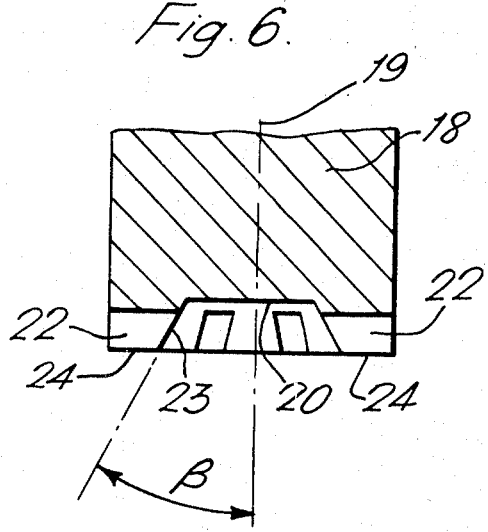

SELF LOCKING NUTS

The present invention relates to the manufacture of all-metal self-locking nuts, and seeks to provide a self-locking nut which can quickly and easily be produced and comprises the desirable properties of excellent prevailing torque and reusability with minimum galling of the threads of a co-operating bolt, even when high-speed nut runners are used.

According to a first aspect of the present invention, there is provided an all-metal self locking nut having a polygonal nut body; a crown extending from the non-bearing end of the nut body; and a screw-threaded bore extending axially through the nut body and crown; the crown having a frustoconical surface defined by a straight line revolved around the axis of the nut at a predetermined angle to this axis and extending from the side of the nut body to a region at or near the emergent periphery of the nut bore at the crown, which frustoconical surface is interrupted by an annular ledge or recess having a flat base extending in a plane parallel to the bearing end of the nut body and perpendicular to the axis of the nut and an inner surface at right angles to the flat base; and the cross-section of the bore being circular within the nut body but deformed inwardly within the crown by reason of a plurality of indentations symmetrically arranged around and in the region of the annular ledge or recess, each of which indentations has in axial section a surface inclined to the nut axis at an angle smaller than the said predetermined angle.

The invention also provides, in a second aspect thereof, a method of manufacturing an all-metal self locking nut, comprising the steps of forming a nut blank having a polygonal nut body, a crown extending from the non-bearing end of the nut body, and a bore extending through the nut body and crown, the crown having a frustoconical surface defined by a straight line revolved around the axis of the nut at a predetermined angle to this axis and extending from the side of the nut body to a region at or near the emergent periphery of the nut bore at the crown; cutting or indenting an annular ledge or recess, having a flat base extending in a plane parallel to the bearing end of the nut body and perpendicular to the axis of the nut and an inner surface at right angles to the flat base, into the frustoconical surface of the crown; and subsequently to the threading of the nut bore, inwardly deforming the cross-section thereof within the crown by reason of indenting the nut crown in the region of the annular ledge or recess to provide a plurality of indentations symmetrically arranged around the annular ledge or recess and each having in axial section a surface inclined to the nut axis at an angle smaller than the said predetermined angle.

While the number of indentations is variable, it is preferred to employ the same number as there are sides to the nut body and to arrange the indentations circumferentially so that their midpoints are substantially in radical alignment with the corners of the nut body. For example, the nut body may be hexagonal and six indentations may be provided in symmetrical arrangement about the circumference of the frustoconical surface of the nut crown, the mid-point of each indentation being aligned with one of the corners of the hexagonal body. The indentations themselves may have a flat base, either extending in a plane parallel to the plane of the bearing end of the nut body and perpendicular to the axis of the nut or at an angle, for example an angle corresponding to the helix angle of the thread in the bore. The base of each indentation may conveniently extend radially outwardly until it forms a shoulder with the undeformed frustoconical surface of the nut crown.

The indentations are preferably formed by means of a punch moved axially downwardly upon the nut crown. This punch will have a central recess to accommodate the inner periphery of the crown around the emerging end of the nut bore, and a plurality of projections or strikes to form the indentations. These strikes have an inner surface inclined to the axis of movement of the punch, i.e., the nut axis, at an angle smaller than the angular inclination of the frustoconical surface of the nut crown; for example, the inner surfaces of the strikes may make an angle of 30° to the axis of the nut, whereas the inclination to the nut axis of the frustoconical surface of the crown may be 60°

The annular ledge or recess is preferably produced as an indentation in the frustoconical crown surface of a nut blank by means of an axial die and prior to threading of the nut bore. Subsequently to threading, the bore cross-section is inwardly deformed within the crown by reason of the plurality of indentations.

In order than the invention may be clearly understood, a preferred embodiment thereof will now be described by way of example only with reference to the accompanying drawings, in which:

FIG. 5 is a bottom plan view on a smaller scale of the indenting punch; and

FIG. 6 is a section along the line VI—VI of FIG. 5 showing the lower part of the punch.

Figure 1:
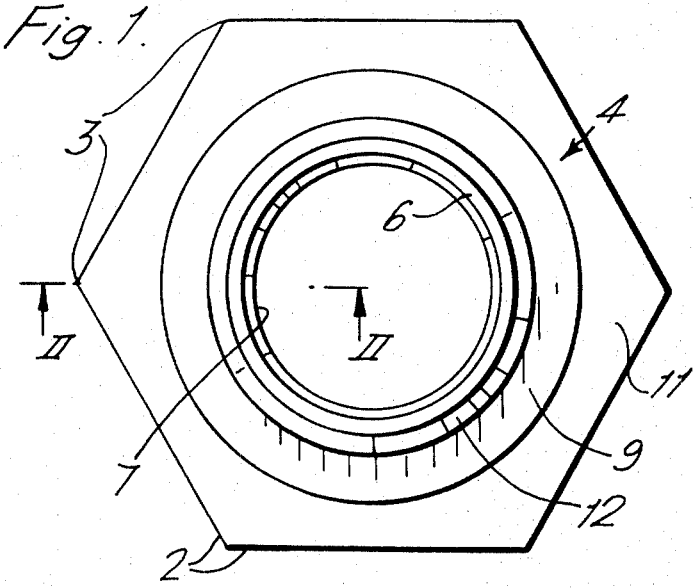
FIG. 1 is a top plan view of a nut blank suitable for the production of the preferred embodiment of nut.
Figure 2:
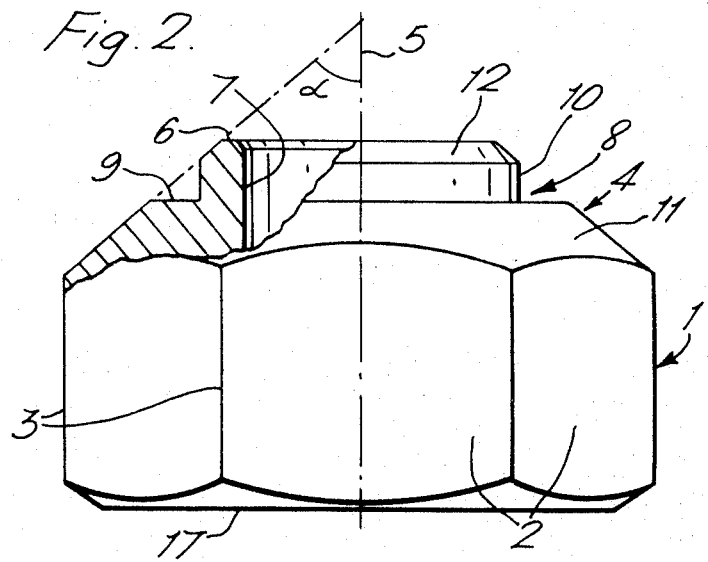
FIG. 2 is a view of the nut blank of FIG. 1 in side elevation and partly in section along the line II—II of FIG. 1.

The nut blank shown in FIGS. 1 and 2, has a body 1 which is hexagonal in shape, having six faces 2 and corners 3. The nut blank has a crown 4 extending from the non-bearing end of the blank and having a frustoconical surface defined by a straight line revolved around the axis 5 of the nut blank at a predetermined angle $\alpha$ to the axis. The crown 4 extends from the side of the nut blank body 1 to an annular end region 6 near the emergent periphery of the nut blank bore 7, which bore extends axially through the nut blank body and the crown. As will be apparent from the drawing, the frustoconical surface of the crown 4 is interrupted by an annular ledge or recess 8 having a flat base 9 extending in a plane parallel to the bearing and of the nut blank body and perpendicular to the axis 5 of the nut blank, and an inner surface 10 at right angles to the flat base 9. The ledge 8 may be conveniently provided by indenting a nut blank initially having a simple frustoconical crown with an axial punch having an annular extension from its free end. The result of forming the annular ledge 8 is to divide the crown 4 into an outer crown 11 and an inner upstanding thin nut collar 12. As will be apparent from FIG. 2, the thickness of the collar 12 is only a small proportion of the total thickness of the nut. In the sectional view of FIG. 2, the collar 12 extends approximately a quarter of the way towards the periphery of nut blank body. The nut blank bore is threaded subsequently to the provision of the ledge 8. We have found this to be particularly important since the resulting threaded nut thus has an undeformed thread at this stage.

Subsequently to the threading operation, portions of the bore are deformed inwardly within the crown as shown at 13 in FIG. 3 by reason of a plurality of symmetrically arranged indentations around and in the region of the ledge 8. In the embodiment shown in FIGS. 3 and 4 there are six indentations 14 arranged symmetrically about the circumference of the crown 4 with their midpoints substantially in radial alignment with the corners 3 of the nut body. Indentations 14 are spaced radially from the bore 7 of the nut and have in axial section an inner surface 15 inclined to the nut axis 5 at an angle β smaller than the angle α of inclination of the frustoconical surfaces of the crown 4, and a flat base 16 extending in a plane parallel to the plane of the bearing end 17 of the nut body and perpendicular to the axis 5 of the nut.

In an alternative form, the base of each identation may be inclined to a plane parallel to the bearing end of the nut at an angle corresponding to the helix angle of the thread in the nut bore 7.

The punch employed to form the indentations 14 is shown in FIGS. 5 and 6. As illustrated, the lower part 18 of the punch is of substantially cylindrical form and during identation it is moved down upon the nut crown, the axis 19 of the punch then coinciding with the axis 5 of the nut. The punch has a central recess 20 to accommodate the inner periphery of the crown 4 around the emerging end of the nut bore 7. In addition, the punch has a plurality of projections or strikes 21 which form the indentations 14. Between these circumferentially spaced strikes 21 are relieved portions 22. Each strike 21 has an inner surface 23 inclined to the axis 19 at the angle β.

The ends 24 of the stikes are planar, so that the bases of the indentations 14 will be parallel to the non-bearing face 17 of the nut. As will be seen, the strikes 21 are arcuate in form and correspond to the arcuate con figuration of the annular ledge 8.

Referring again to FIG. 3, it will be clear that the consequence of forming the indentations 14 in the crown 4 of the nut is to force part of the metal around the periphery of nut bore 7 inwardly, so that the bore is deformed at 13 somewhat towards a hexagonal form. The deformation is small, but sufficient to impart a locking action to the nut when used on a co-operating bolt. It is found in practice that this locking action is reliable but does not impart any permanent damage to the bolt thread. In addition the nut may be unscrewed and reused many times.

Figure 3:
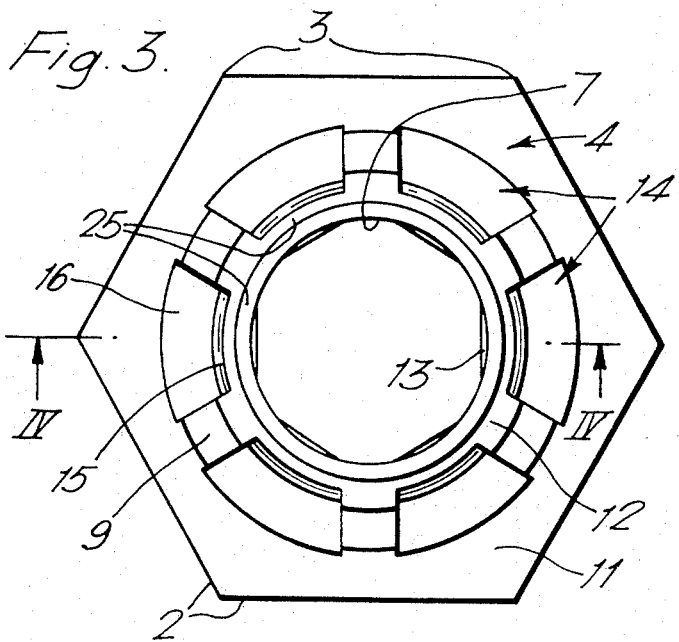
FIG. 3 is a view similar to FIG. 1 of a nut produced from the blank of FIGS. 1 and 2.
Figure 4:
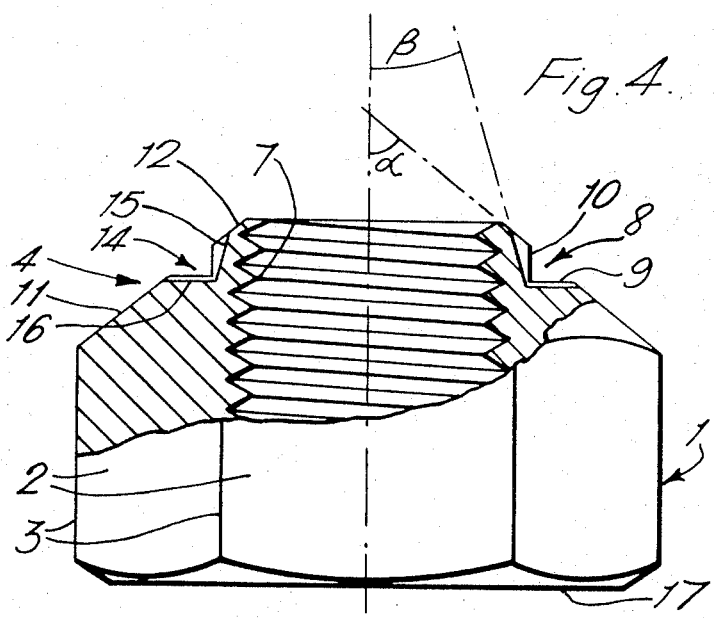
FIG. 4 is a view similar to FIG. 2 of the nut of FIG. 3 and partly in section along the line IV—IV.

It will be clear from FIGS. 3 and 4 that the indentations produced by the punch are made to coincide with the annular ledge 8 so that the inner surface 15 is indented into the full height of inner surface 10 of the ledge 8 (surface 10 being in effect the outer vertical side wall of the collar 12) and flat base 16 is indented into flat base 9 of the ledge 8. We have found that the punch producing the indentations 14 should preferably be sharp-edged to shear the metal of the nut collar 12. The locking portions 25 of the nut collar (including the regions 13 of deformed thread), which portions act as pressure pads against a cooperating bolt, are at least to some extent severed from the remainder of the nut crown or collar. Such severing leads to a greater resiliency of the pressure pads which are connected to the remainder of the nut collar by only a portion of the collar thickness, as will be apparent from FIGS. 3 and 4. It is found in practice that the locking action of this embodiment combined with the enhanced resiliency of its pressure pads makes it particularly reliable in use and reuse.

What we claim is:

1. An all-metal self-locking nut having a polygonal nut body, a crown extending from the non-bearing end of the nut body, and a screw-threaded bore extending through the nut body and crown; the improvement comprising in that said crown has a frustoconical surface defined by a straight line revolved around the axis of the nut at a predetermined angle to said axis and extending from the side of the nut body to a region adjacent the emergent periphery of the bore at the crown, in that an annular ledge dividing the crown into an outer crown and an inner upstanding thin nut collar interrupts said frustoconical surface where said ledge has a flat base extending in a plane perpendicular to the axis of the nut and an inner surface extending at right angles to said flat base and along the vertical side of said nut collar, in that said bore is circular within said nut body, and in that a plurality of indentations are positioned symmetrically around the periphery of said crown into the inner surface along the full height of said vertical side and extending outwardly into said flat base where each said indentation has in axial section a surface inclined to the nut axis at an angle smaller than the said predetermined angle whereby said indentations deform the cross section of the bore within said crown radially inwardly to form locking portions connected to the remainder of the nut by regions of reduced thickness.

2. An all-metal self-locking nut having a polygonal nut body, a crown extending from the on-bearing end of the nut body and a screw-threaded bore extending through the nut body and crown; the improvement comprising in that said crown has a frustoconical surface defined by a straight line revolved around the axis of said nut at a predetermined angle to said axis and extending from the side of the nut body to a region adjacent the emergent periphery of the bore at the crown, in that an annular ledge dividing the crown into an outer crown and an inner upstanding thin nut collar interrupts said frustoconical surface where said ledge has a flat base extending in a plane perpendicular to the axis of the nut and an inner surface at right angles to said flat base, in that said bore is circular within said nut body, and in that a plurality of indentations are positioned symmetrically around the periphery of said crown in the region of said ledge where each said indentation has in axial section a surface indented into said collar inclined to the nut axis at an angle smaller than said predetermined angle whereby said indentations deform the cross section of the bore within said crown radially inwardly to form locking portions connected to the remainder of the nut by regions of reduced thickness wherein said portions are adapted to act as pressure pads against a cooperating bolt and wherein said portions are partially severed from the remainder of the nut collar to increase resiliancy of said portions.

3. An all-metal self-locking nut having a polygonal nut body, a crown extending from the non-bearing end of the nut body and a screw-threaded bore extending through the nut body and crown; the improvement comprising in that said crown has a frustoconical surface defined by a straight line revolved around the axis of said nut at a predetermined angle to said axis and extending from the side of the nut body to a region adjacent the emergent periphery of the bore at the crown, in that an annular ledge dividing the crown into an outer crown and an inner upstanding thin nut collar interrupts said frustoconical surface where said ledge has a flat base extending in a plane perpendicular to the axis of the nut and an inner surface extending at right angles to said flat base, in that said bore is circular within said nut body, and in that a plurality of indentations are positioned symmetrically around the periphery of said crown in the region of said ledge where each said indentation has in axial section a surface indented into said collar inclined to the nut axis at an angle smaller than said predetermined angle and a flat base indented into the flat face of the annular ledge extending in a plane perpendicular to the axis of the nut whereby said indentations deform the cross section of the bore within said crown radially inwardly to form locking portions connected to the remainder of the nut by regions of reduced thickness.

4. An all-metal self-locking nut having a polygonal nut body, a crown extending from the non-bearing end of the nut body and a screw-threaded bore extending through the nut body and crown; the improvement comprising in that said crown has a frustoconical surface defined by a straight line revolved around the axis of said nut at a predetermined angle to said axis and extending from the side of the nut body to a region adjacent the emergent periphery of the bore at the crown, in that an annular ledge dividing the crown into an outer crown and an inner upstanding thin nut collar interrupts said frustoconical surface where said ledge has a flat base extending in a plane perpendicular to the axis of the nut and an inner surface extending at right angles to said flat base, in that said bore is circular within said nut body, and in that a plurality of indentations are positioned symmetrically around the periphery of said crown in the region of said ledge where each said indentation has in axial section a surface indented into said collar inclined to the nut axis at an angle smaller than said predetermined angle and a base inclined at an angle corresponding to the helix angle of the thread in the bore whereby said indentations deform the cross section of the bore within said crown radially inwardly to form locking portions connnected to the remainder of the nut by regions of reduced thickness.

* * * * *